(12) United States Patent
Seder et al.

(10) Patent No.: US 8,606,430 B2
(45) Date of Patent: Dec. 10, 2013

(54) EXTERNAL PRESENTATION OF INFORMATION ON FULL GLASS DISPLAY

(75) Inventors: Thomas A. Seder, Northville, MI (US); Joseph F. Szczerba, Grand Blanc, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 470 days.

(21) Appl. No.: 12/900,539

(22) Filed: Oct. 8, 2010

(65) Prior Publication Data
US 2012/0089273 A1    Apr. 12, 2012

(51) Int. Cl.
*B60Q 1/00*    (2006.01)

(52) U.S. Cl.
USPC ............................................ 701/2; 340/425.5

(58) Field of Classification Search
USPC ........ 701/2, 45, 300, 301; 359/630, 636, 838, 359/839; 340/901–904, 435, 436, 968; 307/10.1; 348/148; 382/104; 345/156, 345/204, 207
See application file for complete search history.

(56) References Cited

U.S. PATENT DOCUMENTS

| | | | |
|---|---|---|---|
| 4,868,542 A * | 9/1989 | Thompson | 340/468 |
| 6,535,884 B1 * | 3/2003 | Thornton et al. | 1/1 |
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 8,098,170 B1 | 1/2012 | Szczerba et al. | |
| 8,098,171 B1 | 1/2012 | Szczerba et al. | |
| 2008/0158510 A1 | 7/2008 | Tant et al. | |
| 2009/0268946 A1 | 10/2009 | Zhang et al. | |
| 2010/0188864 A1 * | 7/2010 | Raghunathan et al. | 362/466 |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |

(Continued)

FOREIGN PATENT DOCUMENTS

EP    1793261    * 6/2007 ............. G02B 27/01

OTHER PUBLICATIONS

U.S. Appl. No. 12/467,340, Szczerba et al.
U.S. Appl. No. 12/467,350, Seder et al.

(Continued)

*Primary Examiner* — Marthe Marc-Coleman (57) ABSTRACT

A method to display a graphic describing a desired communication upon a substantially transparent screen of a vehicle includes monitoring the desired communication, monitoring an external presentation mode to present the desired communication, determining the graphic describing the desired communication, registering a location of the graphic upon the substantially transparent screen to be communicated outside of the vehicle, and displaying the graphic upon a substantially transparent screen comprises one of light emitting particles or microstructures over a predefined region of the screen permitting luminescent display while permitting transmission therethrough.

20 Claims, 3 Drawing Sheets

(56) References Cited

U.S. PATENT DOCUMENTS

| | | |
|---|---|---|
| 2010/0253597 A1 | 10/2010 | Seder et al. |
| 2010/0253598 A1 | 10/2010 | Szczerba et al. |
| 2010/0253599 A1 | 10/2010 | Szczerba et al. |
| 2010/0253600 A1 | 10/2010 | Seder et al. |
| 2010/0253601 A1 | 10/2010 | Seder et al. |
| 2010/0253602 A1 | 10/2010 | Szczerba et al. |
| 2010/0253688 A1 | 10/2010 | Cui et al. |
| 2010/0253918 A1 | 10/2010 | Seder et al. |
| 2010/0254019 A1 | 10/2010 | Cui et al. |
| 2010/0289632 A1 | 11/2010 | Seder et al. |
| 2010/0292886 A1 | 11/2010 | Szczerba et al. |
| 2012/0093357 A1 | 4/2012 | Seder et al. |
| 2012/0169513 A1 | 7/2012 | Szczerba et al. |
| 2012/0169572 A1 | 7/2012 | Seder et al. |
| 2012/0169861 A1 | 7/2012 | Szczerba et al. |
| 2012/0173067 A1 | 7/2012 | Szczerba et al. |
| 2012/0173069 A1 | 7/2012 | Tsimhoni et al. |
| 2012/0174004 A1 | 7/2012 | Seder et al. |

OTHER PUBLICATIONS

U.S. Appl. No. 12/903,267, Seder et al.
U.S. Appl. No. 12/900,566, Szczerba et al.
U.S. Appl. No. 12/980,503, Szczerba et al.
U.S. Appl. No. 12/979,432, Szczerba et al.
U.S. Appl. No. 12/980,522, Szczerba et al.
U.S. Appl. No. 12/980,612, Szczerba et al.
U.S. Appl. No. 12/981,206, Szczerba et al.
U.S. Appl. No. 12/981,602, Szczerba et al.
U.S. Appl. No. 12/982,478, Szczerba et al.

* cited by examiner

EXTERNAL PRESENTATION OF INFORMATION ON FULL GLASS DISPLAY

TECHNICAL FIELD

This disclosure is related to graphical imaging upon a screen of a motor vehicle.

BACKGROUND

The statements in this section merely provide background information related to the present disclosure and may not constitute prior art.

Presentation of information relating to vehicle status to an operator of a vehicle before the operator enters the vehicle is desirable and convenient for the operator. The operator may desire to understand the vehicle health, fuel level, charge level and internal cabin temperature prior to entering the vehicle. Known methods of obtaining information relating to vehicle status include entering the vehicle and accessing the electronic dashboard or accessing other separate devices to obtain specific details relating to vehicle status. Presenting communications corresponding to vehicle status as a graphic upon an exterior window of a vehicle to an operator prior to entering the vehicle is convenient and saves time for the operator to make decisions prior to entering the vehicle.

Personal communications presented to pedestrians outside of a vehicle can include personal messages or customized graphics. Known methods for presenting a personal message would be to include a note left under a window wiper blade or crumpled in a door handle. Often, such notes can blow away or become damaged or ruined due to adverse weather conditions. Often, such notes are never seen by the intended person. Known customized graphics often take the form of flags or stickers permanently attached to the vehicle itself. At times, such customized graphics utilizing stickers and/or flags are not appropriate.

SUMMARY

A method to display a graphic describing a desired communication upon a substantially transparent screen of a vehicle includes monitoring the desired communication, monitoring an external presentation mode to present the desired communication, determining the graphic describing the desired communication, registering a location of the graphic upon the substantially transparent screen to be communicated outside of the vehicle, and displaying the graphic upon a substantially transparent screen comprises one of light emitting particles or microstructures over a predefined region of the screen permitting luminescent display while permitting transmission therethrough.

BRIEF DESCRIPTION OF THE DRAWINGS

One or more embodiments will now be described, by way of example, with reference to the accompanying drawings, in which.

DETAILED DESCRIPTION

Referring now to the drawings, wherein the showings are for the purpose of illustrating certain exemplary embodiments only and not for the purpose of limiting the same, a method utilizing an enhanced vision system (EVS) to represent graphical images upon a substantially transparent screen of a vehicle describing a desired communication. The desired communication can be communicated to pedestrians outside of the vehicle. The graphical images originate from sensor and/or data inputs describing personal communications or communications corresponding to vehicle status and include processing of the inputs in order to convey the desired communication to pedestrians outside of the vehicle. Graphical images to be displayed upon the substantially transparent screen are registered to a location upon the screen for conveniently communicating to pedestrians outside of the vehicle, whereas occupants within the vehicle can still view features located outside of the vehicle through the screen.

Figure 1:
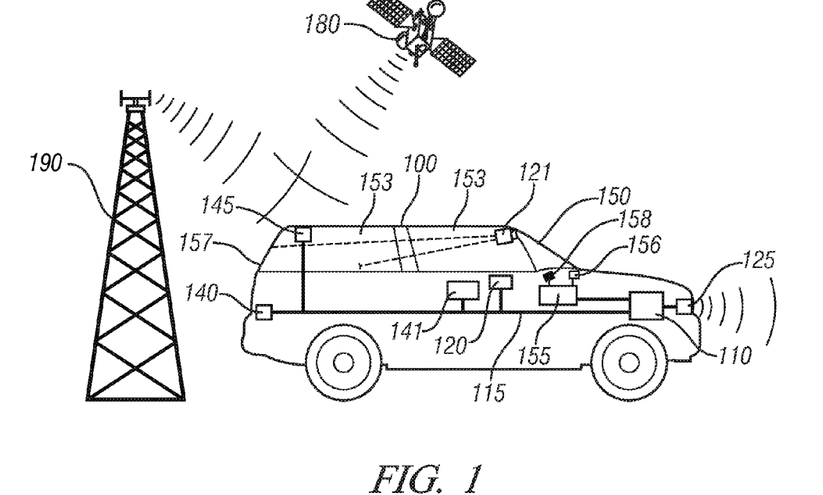
FIG. 1 depicts an exemplary vehicle equipped with an EVS system, in accordance with the present disclosure.

FIG. 1 depicts an exemplary vehicle equipped with an EVS system, in accordance with the present disclosure. Vehicle 100 includes an EVS system manager 110; vehicle status modules configured to monitor vehicle status, including a vehicle control module 125, a vehicle cabin module 141 and a vehicle health module 140; personal communication systems configured to monitor personal communications, including wireless communication system 145 and human machine interface (HMI) 120; EVS graphics system 155 and graphics projection system 158. The EVS system manager 110 includes a programmable processor and programming to monitor various inputs and determine what information is appropriate to display upon the substantially transparent screen describing the desired communication. The EVS system manager 110 can communicate directly with modules and systems, or the EVS system manager 110 can alternatively or additionally communicate over a LAN/CAN system 115. The EVS system manager 110 utilizes information regarding the desired communication to be communicated outside of the vehicle derived from a number of sources. The vehicle control module 125 is configured to monitor various aspects relating to vehicle drivability including, but not limited to, engine temperature levels, fluid levels, tire pressure and odometer reading utilizing various in-vehicle sensors known in the art. The vehicle cabin module 141 is configured to monitor various aspects relating to the vehicle cabin including, but not limited to, temperature inside the vehicle cabin. The vehicle health module 140 is configured to monitor various aspects related to vehicle health including, but not limited to, battery state of health, battery state of life, and fuel level. The wireless communication system 145 is configured to receive inputs associated with desired personal communications to be communicated outside of the vehicle and/or activating an external presentation mode to present the desired communications. The wireless communication system 145 includes internet content, cellular broadcasting content 190 and satellite broadcasting content 180 as sources for the desired personal communications to be communicated outside of the vehicle and/or activating the external presentation mode to present the desired communications. The HMI device 120 is configured to input desired communications from occupants of the vehicle and activate the external presentation mode to present the desired communication outside of the vehicle. Additionally, the HMI device 120 is coupled to a vehicle to vehicle module 156 configured to request desired communications from source vehicles, wherein the source vehicles register the location of the graphic upon a screen or window of the source vehicle communicating to the occupant of the vehicle. It will further be appreciated that the HMI 120 can receive command inputs from the occupant of the vehicle to present desired communications received by utilizing the various modules and systems of the vehicle (e.g., vehicle health module 140).

Windscreen, side windows and rear window 150, 153 and 157, respectively, includes features capable of displaying an image projected thereupon while remaining transparent or substantially transparent such that occupants of the vehicle can clearly observe outside of the vehicle through the windscreen, side windows and rear window 150, 153 and 157, respectively. For simplicity, the substantially transparent screen can represent any one of the windscreen, side windows and rear window 150, 153 and 157, respectively. It is understood that the image projected thereupon is visible to pedestrians outside of the vehicle. EVS graphics system 155 includes display software or programming translating requests to display desired communications from the EVS system manager 110 in graphical representations describing the desired communications. The EVS graphics engine 155 includes programming to compensate for the curved and tilted surfaces of the substantially transparent screen and any other surfaces onto which graphics are to be projected. EVS graphics engine 155 controls graphics projection system 158 including a laser or projector device producing an excitation light to project the graphical representations. The EVS system manager 110 can accurately register the graphical representations upon the substantially transparent screen such that pedestrians outside of the vehicle can see the images describing the desired communication. Such an exemplary system for registering graphical representations upon the substantially transparent screen is disclosed in co-pending U.S. patent application Ser. No. 12/417,077, entitled ENHANCED VISION SYSTEM FULL-WINDSHIELD HUD, filed on Apr. 2, 2009, and is herein incorporated by reference.

Figure 2:
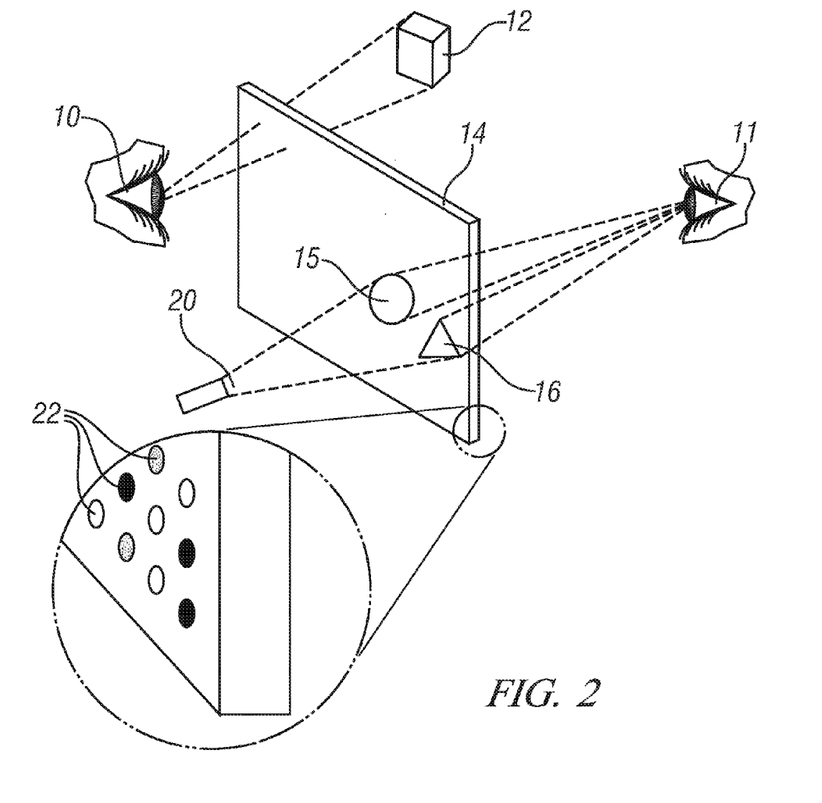
FIG. 2 is an exemplary diagram of a substantially transparent display, in accordance with the present disclosure.

In order to function as a medium through which relevant features are observable while serving as a display device upon which the graphical images may be displayed, the substantially transparent screen of the vehicle must be both transparent and capable of displaying images projected by an excitation light source. FIG. 2 is an exemplary diagram of a substantially transparent display, in accordance with the present disclosure. Occupant 10 is able to see an arbitrary object (e.g. cube 12) through substrate 14. Substrate 14 may be transparent or substantially transparent. While occupant 10 sees arbitrary object 12 through substrate 14, a viewer 11 on the other side of the substrate 14 can also see images (e.g. circle 15 and triangle 16) that are created at substrate 14. Substrate 14 may be part of a vehicle windshield, a vehicle side window, a vehicle rear window, a building window, a glass substrate, a plastic substrate, a polymer substrate, or other transparent (or substantially transparent) medium that would be appreciated by one having ordinary skill in the art. Other substrates may complement substrate 14 to provide for tinting, substrate protection, light filtering (e.g. filtering external ultraviolet light), and other functions.

FIG. 2 depicts illumination of transparent displays illuminated with excitation light (e.g. ultraviolet light or infrared light) from light sources (e.g. a projector or laser, depicted by device 20, in accordance with embodiments. Substrate 14 may receive excitation light from a light source (e.g. projector or laser 20). The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In embodiments illustrated in FIG. 1, the excitation light is output by device 121 including a projector. The projector may be a digital projector. In embodiments, the projector is a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. In other embodiments, the projector is a liquid crystal display (LCD) projector. In embodiments, the projector may be a liquid crystal on silicon (LCOS) projector. In embodiments, the projector may be an analog projector (e.g. a slide film projector or a movie film projector). One having ordinary skill in the art would appreciate other types of projectors which may be used to project ultraviolet light on substrate 14.

Returning to the exemplary embodiment illustrated in FIG. 2, an excitation light is output from device 20, in this example, a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 2 is an exemplary diagram of light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 2 illustrates light emitting material, including light emitting particles 22, dispersed in a substantially transparent substrate, according to embodiments of the disclosure. These light emitting particles 22 can be substantially similar particles throughout, or, as depicted in FIG. 2, the particles can vary in composition. When excitation light is absorbed by the light emitting particles 22, the particles emit visible light. Accordingly, in down-conversion embodiments, when ultraviolet light is absorbed by light emitting materials, visible light is emitted from the light emitting materials. Likewise, in up-conversion embodiments, when infrared light is absorbed by light emitting materials, visible light is emitted from the light emitting materials. In embodiments, each of light emitting materials may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as depicted in FIG. 2, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 400 nanometers. According to embodiments, each of the light emitting particles has a diameter that is less than about 300 nanometers. According to embodiments, each of the light emitting particles has a diameter that is less than about 200 nanometers. According to embodiments, each of the light emitting particles has a diameter that is less than about 100 nanometers. According to other embodiments, each of the light emitting particles has a diameter that is less than about 50 nanometers. The light emitting particles may be individual molecules.

Other methods can be applied for integrating light emitting materials on a surface of substrate 14. Similar to embodiments illustrated in FIG. 2, each of the light emitting materials may be a different type of light emitting material, which emit a different range of wavelengths of visible light in response to a different range of wavelengths of excitation light (e.g. ultraviolet or infrared light). Light emitting material may be fluorescent material, which emits visible light in response to absorption of electromagnetic radiation (e.g. visible light, ultraviolet light, or infrared light) that is a different wavelength than the emitted visible light. Light emitting material may include light emitting particles.

Transparent or substantially transparent displays may have many applications. For example, transparent or substantially transparent displays may display an image on a transparent or translucent window of parked vehicles, such as automobiles, motorcycles, aircrafts, and boats; the image may be communications that are personal or corresponding to status of the vehicle. For example, vehicle health that is currently displayed on the dashboard electronic display once the vehicle is started, may be projected onto the windows (e.g., front glass, windscreen, side glass, rear glass) to be communicated to an operator of the vehicle prior to entering and starting the vehicle. Additionally, customized graphics, such as sports team logos, may be projected onto the windows replacing permanent stickers placed on the windows or the need for flags attached to the vehicle.

Embodiments envisioned include displaying a graphic upon a substantially transparent screen or window of a vehicle to be communicated outside of the vehicle, wherein the graphic describes a desired communication. The desired communication is monitored and an external presentation mode to present the desired communication is also monitored by the EVS system manager 110. The graphic describing the desired communication is determined and a location of the graphic upon the substantially transparent screen is registered to communicate the desired communication outside of the vehicle by the EVS system manager 110. The graphic is displayed upon the substantially transparent screen when the monitored external presentation mode to present the desired communication is activated. As aforementioned, the substantially transparent screen includes one of light emitting particles or microstructures over a predefined region of the screen or window permitting luminescent display while permitting transmission therethrough.

Figure 3A:
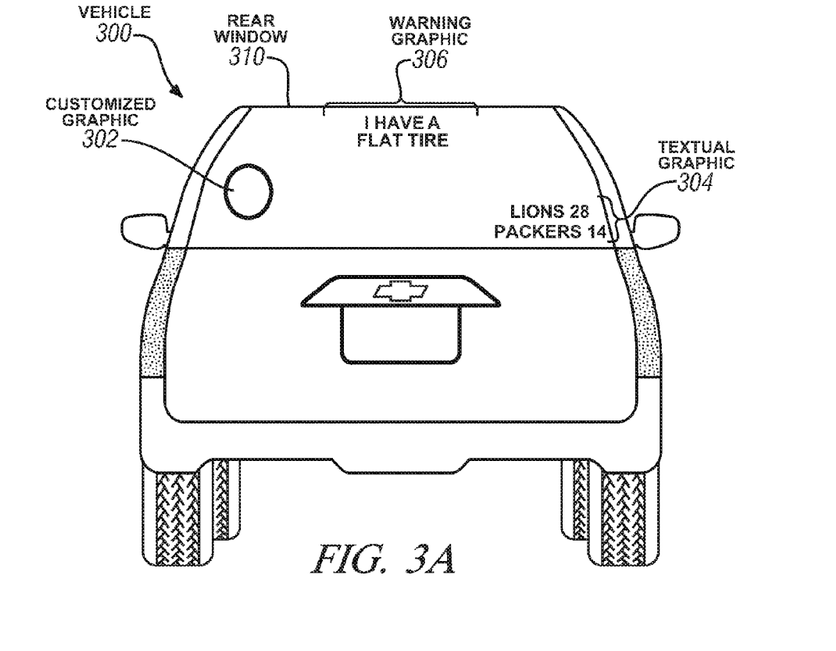
FIGS. 3A and 3B depict graphics projected upon windows of a motor vehicle, the graphics describing desired communications to be communicated outside of the vehicle corresponding to vehicle status and personal communications, in accordance with the present disclosure.
Figure 3B:
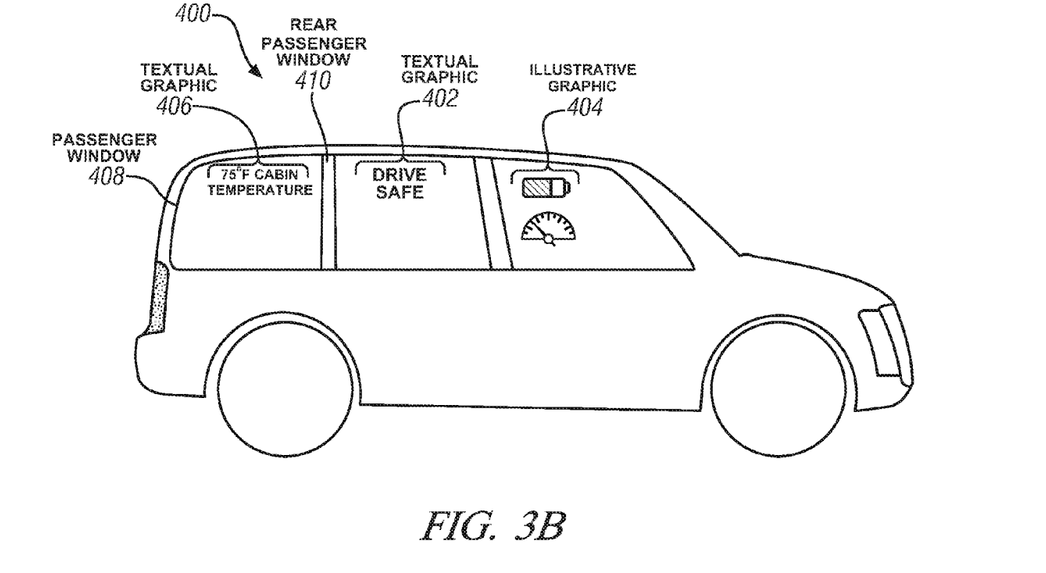

As aforementioned, the desired communication to be presented can include personal communications. Personal communications can include customized insignias where the graphic describing the customized insignia includes a customized graphic. Customized graphics can include favorite sports team logos, university logos, entertainment logos and political logos. The customized graphic can be registered upon any window of the vehicle including the rear window of the vehicle such that the customized graphic is communicated to trailing vehicles along a roadway. It is appreciated that customized graphics registered upon a window of the vehicle can replace the use of permanent stickers physically affixed to a vehicle window or flags attached to the vehicle itself. Referring to FIG. 3A, an example of a customized graphic 302 is displayed on the rear window 310 of a vehicle 300. The customized graphic 302 describing the desired communication can be accessed from a database stored within the HMI device 120 or accessed via the wireless communication system 145. In another example, the desired personal communication can include a textual graphic describing a sporting event currently being played. The textual graphic can be accessed via the wireless communication system 145 utilizing the internet content, the cellular broadcasting content 190 or the satellite broadcasting content 180. Referring to FIG. 3A, a textual graphic 304 describing a sports score is displayed upon the rear window 310 of the vehicle 300. Personal communications can further include personal messages. For example, a textual graphic describing the personal message can be registered upon a passenger window of a vehicle to be communicated outside of the vehicle. For instance, a mother may leave a personal message to be read by her children when they come home from school that she is out walking the dog and will be back in time for dinner. Referring to FIG. 3B, an example of a textual graphic 402 describing a personal message is displayed on a rear passenger side window 410 of a vehicle 400. It should be understood that desired communications that include personal communications are not limited to personal messages utilizing textual graphics and customized insignias utilizing customized graphics but can include any graphic describing a communication that is personal in nature to be communicated to somebody outside of the vehicle 300 and 400.

The desired communication to be communicated outside of the vehicle can further include communications corresponding to vehicle status. It can be desirable for an operator of a vehicle to be aware of and understand the vehicle status prior to entering the vehicle. For instance, a vehicle battery may be charging and it may desirable for the operator of the vehicle to be able to quickly determine the charge of the battery without having to go inside the vehicle and/or start the vehicle to read the electronic dashboard to obtain the charge of the battery. Vehicle status can be determined by monitoring vehicle health module 140 including monitoring gauges relating to vehicle health. The EVS system manager 110 can determine an illustrative graphic describing the gauges relating to vehicle health. In an example, the illustrative graphic can describe the battery state of charge and the fuel level, wherein the illustrative graphic can be registered upon a window of the vehicle to be communicated to the driver prior to entering the vehicle. Referring to FIG. 3B, the illustrative graphic 404 registered upon a front side window 404 of the vehicle 400 includes a symbol of a battery describing a three-quarters charge and a fuel gauge describing a full fuel level. Further, vehicle status can be determined by monitoring the vehicle control module 125 utilizing in-vehicle sensors to monitor tire pressure, oil level, engine operating temperature or other parameters that affect vehicle drivability. If the one or more of the in-vehicle sensors determine that vehicle drivability may be threatened, a warning graphic describing a warning message may be utilized by the EVS system manager 110 to display the warning graphic upon a window of the vehicle. For example, referring to FIG. 3A, the warning graphic 306 registered upon the rear window 310 of the vehicle 300 can include a textual message communicating to vehicles traveling behind the vehicle that the front passenger-side tire is flat. The warning graphic can be determined to flash in bright colors to gain the attention of any vehicle that may be trailing behind the vehicle to warn the trailing vehicle of the flat tire. Monitoring a communication corresponding to vehicle status can further include monitoring an internal cabin message from the internal cabin module 145. As aforementioned, the internal cabin module 145 monitors the environment of the internal cabin of the vehicle 100 including the temperature of the internal cabin. For example, the graphic describing the temperature inside the cabin can include a textual graphic describing the internal cabin temperature. Referring to FIG. 3B, a textual graphic 406 is registered upon a rear passenger side window 408 describing the temperature inside the cabin of the vehicle 400.

The EVS system manager 110 further monitors the external presentation mode configured to present the desired communication. An input corresponding to the desired communication is received by the EVS system manager 110 and the external presentation mode to present the desired communication is activated based on the received input. As aforementioned, when the external presentation mode is activated, the graphic describing the desired communication is displayed upon a screen or window of the vehicle. The input corresponding to the desired communication can include a command input to the HMI device 120 from an occupant of the vehicle 100 to present the desired communication, wherein the external presentation mode to present the desired communication is activated immediately subsequent to the operator entering the command input to the HMI device 120. For instance, the operator of the vehicle can enter a personal message to be displayed as a graphic upon the passenger window of the vehicle, wherein the external presentation mode is activated and the graphic displayed upon entering the personal message. Alternatively, the operator of the vehicle can enter the personal message to be displayed as a graphic upon the passenger window of the vehicle commencing at a desired period of time (e.g., in a half-hour) subsequent to receiving the command input including the personal message into the HMI device 120, wherein the external presentation mode is activated and the graphic displayed a half hour after entering the personal message into the HMI device 120. Receiving the input corresponding to the desired communication can include receiving a command input wirelessly communicated to the vehicle to present the desired communication. For instance, utilizing a PDA device or laptop, an operator can wirelessly communicate with the vehicle to display a graphic describing a desired communication (e.g., personal message or vehicle status) upon the window of the vehicle. Based on the wirelessly communicated command input, the external presentation mode can be activated to present the graphic describing the desired communication immediately subsequent to receiving the wirelessly communicated command input or commencing at a desired period of time subsequent to receiving the command input. It is understood that the cellular broadcasting content 190 and/or the satellite broadcasting content 180 can be utilized to wirelessly communicate the input to the EVS system manager 110. In another example, an operator of the vehicle can send an activation command to the EVS system manager 110 utilizing a key FOB device to activate the external presentation mode. Likewise, the key FOB device can be utilized to deactivate the external presentation mode by sending a deactivation command to the EVS system manager 110. For instance, the operator of the vehicle may desire to view the vehicle status prior to entering the vehicle and can do so by utilizing the key FOB device to activate the external presentation mode to display the graphic describing the status of the vehicle. In yet another example, the external presentation mode can be activated to present the desired communication based on detecting a pedestrian proximate to the vehicle. Pedestrian detection is known in the art and methods known in the art for detecting pedestrians include motion sensors, infrared sensors and radar sensors. For instance, a personal communication left by the operator of the vehicle can be displayed anytime a pedestrian is proximate to the vehicle allowing the graphic to only be displayed when somebody is proximate to the vehicle. Likewise, the external presentation mode can be deactivated when no pedestrian is detected proximate to the vehicle. In yet another example, the selected gear of the vehicle is monitored and when it is detected that the selected gear is in park, the external presentation mode to present the desired communication is activated. For example, a group tailgating at a sporting event may desire personal communications that include customized graphics to be displayed upon a window of a vehicle during the tailgate. When the vehicle is in park, the external presentation mode is activated, wherein the graphic upon the window can be displayed.

Monitoring the external presentation mode to present the desired communication can further be based on a vehicle to vehicle communication. The vehicle to vehicle communication includes conveying a presentation request from a second vehicle to the vehicle, wherein the presentation request corresponds to the desired communication. Based on the presentation request, the external presentation mode is activated, wherein the location of the graphic to be communicated outside of the vehicle is registered upon a window of the vehicle communicating to the second vehicle. For instance, the second vehicle can convey the presentation request corresponding to a planned route of the vehicle, wherein a planned route graphic describing the planned route of the vehicle can be displayed upon a rear window of the vehicle such that the second vehicle can view the planned route graphic describing the planned route of the vehicle.

Figure 4:
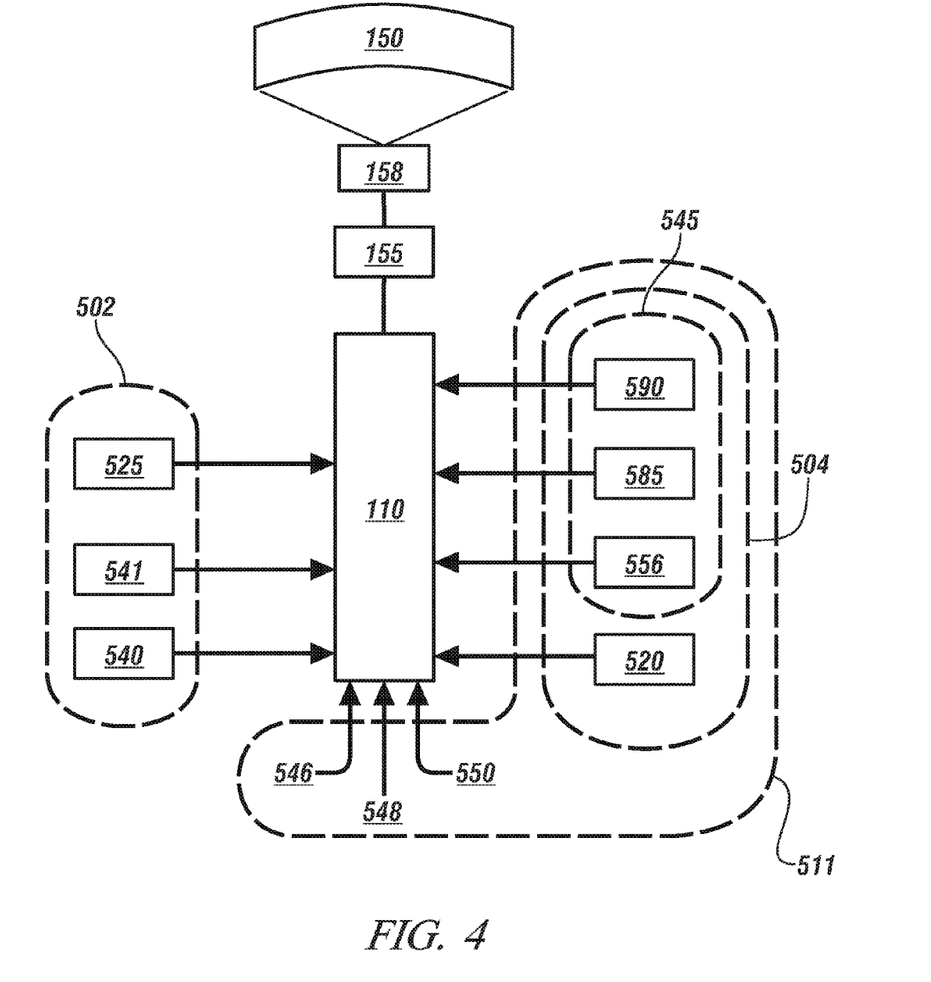
FIG. 4 schematically depicts an exemplary information flow accomplishing methods for monitoring desired communications and monitoring an external presentation mode, in accordance with the present disclosure.

Information flows and processes to control the methods described above can take many embodiments. FIG. 4 schematically depicts an exemplary information flow accomplishing methods described above, in accordance with the present disclosure. Process 500 includes an EVS system manager 110 monitoring a desired communication 502 and 504 and monitoring an external presentation mode 511 to present the desired communication. The desired communication can include communications corresponding to vehicle status 502 and desired personal communications 504. The process 500 further includes an EVS graphics system 155 monitoring display requirements from the EVS system manager 110 and generating graphics commands, and a graphics projection system 158 projecting light upon a substantially transparent screen of a vehicle, the substantially transparent screen can include a windscreen, side windows and a rear window. A number of exemplary sources for monitoring the desired communication are described, including the sources for monitoring the communications corresponding to vehicle status 502 including a vehicle control module 525, a vehicle cabin module 541 and a vehicle health module 540. A number of exemplary sources for monitoring the desired personal communications 504 including inputs from an HMI device 520 and a wireless communication system 545, the wireless communication system 545 includes cellular broadcasting content 590, internet content 585 and vehicle to vehicle communication 556. Sources for monitoring the external presentation mode 511 include key FOB inputs 550, current gear selection 548, pedestrian detection 546, inputs from the HMI device 520, the vehicle to vehicle communication 556, the internet content 585 and the cellular broadcasting content 590. It should be appreciated that the methods for monitoring the desired communications and the external presentation mode are not limited to the sources described above.

It will be appreciated that these sources of information can take many forms as described throughout this disclosure, and the disclosure is not intended to be limited to the particular embodiments described herein. It will be appreciated that cellular broadcasting content 590, vehicle health content 540 and internet content 585 can be interdependent information. Correlation between these sources of information can occur within EVS system manager 100, or, as depicted in FIG. 4, the devices providing the information to the EVS system manager 110 can include programming to coordinate information before or simultaneous to providing information to the system manager. Through this exemplary process, information can be monitored and utilized to project images upon any window within the vehicle to be communicated outside of the vehicle.

The above disclosure describes a substantially transparent screen capable of full-screen display. It will be appreciated that similar methods can be employed upon screens utilizing a substantially full-screen display or a partial screen display. As aforementioned the substantially transparent screen can include any plastic or glass window of the vehicle including a driver side window, a front passenger side window, rear passenger side windows, a windscreen, a rear window or a sun roof. Many embodiments of displays are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to display a graphic upon a transparent screen of a vehicle to be communicated outside of the vehicle, the graphic describing a desired communication, comprising:
at an enhanced vision system (EVS) system manager:
monitoring the desired communication;
monitoring an external presentation mode to present the desired communication;
determining the graphic describing the desired communication;
registering a location of the graphic upon the transparent screen to be communicated outside of the vehicle; and
at a graphics projection system, displaying the graphic upon a transparent screen comprises one of light emitting particles or microstructures over a predefined region of the screen permitting luminescent display while permitting transmission therethrough.

2. The method of claim 1 wherein monitoring a desired communication comprises monitoring a desired personal communication.

3. The method of claim 2 wherein the desired personal communication comprises a customized insignia;
wherein the graphic describing the desired communication comprises a customized graphic describing the customized insignia; and
wherein the customized graphic is registered upon a rear window of the vehicle to be communicated outside of the vehicle, the rear window comprising the transparent screen.

4. The method of claim 2 wherein the desired personal communication comprises a personal message;
wherein the graphic describing the desired communication comprises a textual graphic describing the personal message; and
wherein the textual graphic is registered upon a passenger window of the vehicle to be communicated outside of the vehicle, the passenger window comprising the transparent screen.

5. The method of claim 1 wherein monitoring the desired communication comprises monitoring a communication corresponding to vehicle status.

6. The method of claim 5 wherein monitoring the communication corresponding to vehicle status comprises monitoring gauges relating to vehicle health;
wherein the graphic describing the desired communication comprises an illustrative graphic describing the gauges relating to vehicle health; and
wherein the illustrative graphic is registered upon a window of the vehicle to be communicated to a driver prior to entering the vehicle, the window comprising the transparent screen.

7. The method of claim 5 wherein monitoring the communication corresponding to vehicle status comprises monitoring a warning message relating to vehicle drivability;
wherein the graphic describing the desired communication comprises a warning graphic describing the warning message relating to vehicle drivability;
wherein the warning graphic is registered upon a window of the vehicle to be communicated outside of the vehicle, the window comprising the transparent screen.

8. The method of claim 5 wherein monitoring the communication corresponding to vehicle status comprises monitoring an internal cabin message;
wherein the graphic describing the desired communication comprises a textual graphic describing the internal cabin message; and
wherein the textual graphic is registered upon a window of the vehicle to be communicated to a driver prior to entering the vehicle, the window comprising the transparent screen.

9. The method of claim 1 wherein monitoring the external presentation mode to present the desired communication comprises:
receiving an input corresponding to the desired communication;
activating the external presentation mode to present the desired communication based on the received input; and
wherein displaying the graphic upon the transparent screen comprises displaying the graphic when the external presentation mode is activated.

10. The method of claim 9 wherein receiving the input corresponding to the desired communication comprises receiving a command input to a human machine interface from an occupant of the vehicle to present the desired communication; and wherein the external presentation mode is activated immediately subsequent to the command input.

11. The method of claim 9 wherein receiving the input corresponding to the desired communication comprises receiving a command input to a human machine interface from an occupant of the vehicle to present the desired communication; and wherein the external presentation mode is activated at a desired period of time subsequent to receiving the command input.

12. The method of claim 9 wherein receiving the input corresponding to the desired communication comprises receiving a command input wirelessly communicated to the vehicle to present the desired communication; and wherein the external presentation mode is activated immediately subsequent to receiving the wirelessly communicated command input.

13. The method of claim 9 wherein receiving the input corresponding to the desired communication comprises receiving a command input wirelessly communicated to the vehicle to present the desired communication; and wherein the external presentation mode is activated at a desired period of time subsequent to receiving the wirelessly communicated command input.

14. The method of claim 1 wherein monitoring the external presentation mode to present the desired communication is based on a vehicle to vehicle communication comprising:
    conveying a presentation request from a second vehicle to the vehicle, the presentation request corresponding to the desired communication;
    activating the external presentation mode to present the desired communication based on the presentation request;
    wherein registering the location of the graphic upon the transparent screen to be communicated outside of the vehicle comprises registering the graphic upon a window of the vehicle communicating to an occupant of the second vehicle; and
    wherein displaying the graphic upon the transparent screen comprises displaying the graphic upon the window of the vehicle when the external presentation mode is activated.

15. The method of claim 14 wherein the desired communication comprises a planned route of the vehicle; and
    wherein determining the graphic describing the desired communication comprises a planned route graphic describing the planned route of the vehicle.

16. Method to display a graphic upon a transparent screen of a vehicle to be communicated outside of the vehicle, the graphic describing a desired communication, comprising:
    at an enhanced vision system (EVS) system manager:
        monitoring the desired communication;
        monitoring an external presentation mode to present the desired communication, comprising:
            receiving an activation input corresponding to the desired communication; and
            activating the external presentation mode to present the desired communication based on the received activation input;
        determining the graphic describing the desired communication;
        registering a location of the graphic upon the transparent screen to be communicated outside of the vehicle; and
        when the external presentation mode is activated, displaying at a graphics projection system the graphic upon a transparent screen comprising one of light emitting particles or microstructures over a predefined region of the screen permitting luminescent display while permitting transmission therethrough.

17. The method of claim 16 wherein receiving the activation input corresponding to the desired communication comprises receiving an activation command from a key fob;
    wherein activating the external presentation mode to present the desired communication based on the received input comprises activating the external presentation mode based on the activation command from the key fob; and
    further comprising deactivating the external presentation mode based on a deactivation command from the key fob device.

18. The method of claim 16 wherein receiving the input corresponding to the desired communication comprises detecting a pedestrian proximate to the vehicle;
    wherein activating the external presentation mode to present the desired communication based on the received input comprises activating the external presentation mode based on the detected pedestrian proximate to the vehicle; and
    further comprising deactivating the external presentation mode based on detecting no pedestrian proximate to the vehicle.

19. The method of claim 16 wherein receiving the input corresponding to the desired communication comprises:
    monitoring a selected gear of the vehicle;
    detecting the selected gear in park; and
    wherein activating the external presentation mode to present the desired communication based on the received input comprises activating the external presentation mode based on detecting the selected gear in park.

20. System to display a graphic upon a transparent screen of a vehicle to be viewed outside of the vehicle, the graphic describing a desired communication, the system comprising:
    the transparent screen comprising one of light emitting particles or microstructures over a predefined region of the windscreen permitting luminescent display while permitting vision therethrough;
    an enhanced vision system system manager
        monitoring the desired communication,
        monitoring an external presentation mode to present to the desired communication,
        determining the graphic describing the desired communication, and
        registering a location of the graphic upon the transparent screen to be communicated outside of the vehicle;
    a graphics system generating the graphic describing the desired communication based upon the registered location of the graphic; and
    a graphics projection system communicating with the graphics system and displaying the graphic describing the desired communication upon the transparent screen to be viewed outside of the vehicle.

* * * * *